(12) United States Patent
 Shibata et al.

(10) Patent No.: US 8,705,637 B2
(45) Date of Patent: Apr. 22, 2014

(54) SIGNAL TRANSMISSION DEVICE

(75) Inventors: Osamu Shibata, Hyogo (JP); Hiroshi Suenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/805,456

(22) PCT Filed: Feb. 13, 2012

(86) PCT No.: PCT/JP2012/000936
§ 371 (c)(1),
(2), (4) Date: Dec. 19, 2012

(87) PCT Pub. No.: WO2012/114672
PCT Pub. Date: Aug. 30, 2012

(65) Prior Publication Data
US 2013/0114657 A1     May 9, 2013

(30) Foreign Application Priority Data
Feb. 23, 2011 (JP) ................................. 2011-037153

(51) Int. Cl.
*H04B 3/00* (2006.01)

(52) U.S. Cl.
USPC ........... 375/257; 375/219; 375/295; 327/108; 327/65; 327/563

(58) Field of Classification Search
USPC ............. 375/257, 295, 219; 327/108, 65, 563
See application file for complete search history.

(56) References Cited

U.S. PATENT DOCUMENTS

| | | | |
|---|---|---|---|
| 6,307,543 B1 | 10/2001 | Martin | |
| 6,346,832 B1 | 2/2002 | Young | |
| 6,492,984 B2 | 12/2002 | Martin | |
| 7,042,254 B2 | 5/2006 | Hori | |
| 2002/0044147 A1 | 4/2002 | Martin | |
| 2004/0239374 A1 | 12/2004 | Hori | |

FOREIGN PATENT DOCUMENTS

| | | |
|---|---|---|
| JP | 2002-204272 | 7/2002 |
| JP | 2004-504733 | 2/2004 |
| JP | 2004-356714 | 12/2004 |
| JP | 2008-193606 | 8/2008 |
| JP | 2009-290843 | 12/2009 |

OTHER PUBLICATIONS

International Preliminary Report on Patentability and Written Opinion of the International Searching Authority issued Sep. 6, 2013 in International (PCT) Application No. PCT/JP2012/000936.
International Search Report issued Mar. 6, 2012 in International (PCT) Application No. PCT/JP2012/000936.

*Primary Examiner* — Zewdu Kassa
(74) *Attorney, Agent, or Firm* — Wenderoth, Lind & Ponack, L.L.P.

(57) ABSTRACT

A signal transmission device including: a differential signal transmission unit having two output terminals for outputting a differential signal to a paired signal lines including first and second signal lines; a single-ended signal transmission unit having two output terminals for outputting independent two-channel single-ended signals to the paired signal lines; and a filter unit having first and second common mode filters. One terminal of the differential signal transmission unit and one terminal of the single-ended signal transmission unit are connected to the first signal line via one inductor of the first common mode filter of the filter unit. The other one terminal of the differential signal transmission unit and the other one terminal of the single-ended signal transmission unit are connected to the second signal line via one inductor of the second common mode filter of the filter unit.

11 Claims, 8 Drawing Sheets

SIGNAL TRANSMISSION DEVICE

TECHNICAL FIELD

The present invention relates to a signal transmission device, and particularly relates to the signal transmission device for transmitting a differential signal and a single-ended signal.

BACKGROUND ART

Conventionally, a signal transmission device (data interface) mainly uses a transmission system for transmitting a single-ended signal in parallel. However, in accordance with recent demands for increase in speed of the system, the transmission system in the signal transmission device is being replaced by a system for transmitting a differential signal serially.

In such a transit period of the replacement of the transmission system, it is beneficial that a general-purpose signal transmission device dealing with both systems of the conventional transmission system (the transmission system for transmitting the single-ended signal in parallel) and the transmission system to be newly introduced (the transmission system for transmitting differential signal serially), to thereby have compatibility with a device that supports the conventional signal transmission system only.

Different noise countermeasures in the signal transmission device are helpful between the case using the single-ended signal and the case using the differential signal. For example, in the signal transmission device using single-ended signals, a resistor or an inductor for suppressing a normal mode current (differential mode current) is normally used as the noise countermeasure. On the contrary, in the signal transmission device using differential signals, a common mode filter for suppressing a common mode current is normally used as the noise countermeasure.

For this reason, in the signal transmission device which deals with both the transmission system using single-ended signals and the transmission system using differential signals, it is beneficial to take a noise countermeasure suitable for the both systems.

Patent Literature 1 (JP 2009-290843 A) discloses a signal transmission device that deals with both of the signal transmission using differential signals and the signal transmission using single-ended signals. The signal transmission device transmits a differential signal and in-phase single-ended signals to connected two signal lines in a superimposed manner.

CITATION LIST

Patent Literature

PTL 1: JP 2009-290843 A

SUMMARY OF INVENTION

Technical Problem

However, in the signal transmission device of Patent Document 1, from a viewpoint of the noise countermeasure, in-phase single-ended signals are transmitted using two signal lines. For this reason, in a constitution of the signal transmission device of Patent Document 1, a single-ended signal of one channel can only be transmitted via the two signal lines.

The present invention is devised in view of the above problem, and an object thereof is to provide a signal transmission device that realizes a secure noise countermeasure with a simple constitution and is capable of transmitting a differential signal and independent two channel single-ended signals using two signal lines.

Solution to Problem

One aspect is a signal transmission device that includes: a differential signal transmission unit having two output terminals operable to output a differential signal to a pair of signal lines including a first signal line and a second signal line; a single-ended signal transmission unit having two output terminals operable to output mutually independent two-channel single-ended signals to the first signal line and the second signal line respectively; and a filter unit including a first common mode filter and a second common mode filter. One of the output terminals of the differential signal transmission unit and one of the output terminals of the single-ended signal transmission unit are connected to the first signal line via one of two inductors of the first common mode filter of the filter unit. The other one of the output terminals of the differential signal transmission unit and the other one of the output terminals of the single-ended signal transmission unit are connected to the second signal line via one of two inductors of the second common mode filter of the filter unit.

In the one aspect, the other inductor of the first common mode filter and the other inductor of the second common mode filter may be opened.

In the one aspect, the other inductor of the first common mode filter and the other inductor of the second common mode filter may be grounded.

In the one aspect, the other inductor of the first common mode filter and the other inductor of the second common mode filter may be grounded via resistive elements.

In the one aspect, a driver circuit connected between the other inductor of the first common mode filter and the ground and between the inductor of the second common mode filter and the ground and a driver controller operable to control a state of the driver circuit between a high impedance state and a low output state may be further provided.

In the one aspect, when the signal transmission device outputs the differential signal, the driver controller may control the state of the driver circuit into the low output state, and when the signal transmission device outputs a single-ended signal, the driver controller may control the state of the driver circuit into the high impedance state.

In the one aspect, the first common mode filter and the second common mode filter may be two common mode filter circuits included in one array-type common filter.

In the one aspect, the one inductor of the first common mode filter and the one inductor of the second common mode filter may constitute a combination of two inductors most isolated physically in the array type common mode filter.

In the one aspect, a differential signal receiving unit operable to receive a differential signal from the pair of signal lines via the filter unit may be provided.

In the one aspect, single-ended signal receiving unit operable to receive mutually independent 2-channel single-ended signals from the first signal line and the second signal line via the filter unit may be further provided.

In one aspect, a clock signal may be transmitted as the differential signal.

Advantageous Effects of Invention

The signal transmission device is provided with a noise filter including a plurality of common mode filters and having characteristics suitable for the noise countermeasure and transmission of both the differential signal and the single-ended signal. As a result, the device realizes the secure noise countermeasure using the noise filter having a very simple constitution, and can transmit the differential signal and the independent 2-channel single-ended signals using two signal lines.

DESCRIPTION OF EMBODIMENTS

Embodiments will be described in detail below with reference to accompanying drawings.

(Outline)

A signal transmission device according to each embodiment described below can transmit a differential signal and an independent two-channel single-ended signal using two signal lines.

One of the features of the signal transmission device is its noise countermeasure. In the signal transmission device, a plurality of (for example, two) common mode filters are used as the noise countermeasure. The common mode filter each has two inductors, and only one inductor of each of the common mode filters is connected to a signal line. By the workings of the common mode filters connected to the signal lines in such a manner, it is made possible to cut unnecessary high-frequency components included in the differential signal, the single-ended signal etc. while a band for transmission of a differential signal and a single-ended signal is maintained. Thus, secure noise countermeasure is realized whereas quality in the signals of both the systems is maintained.

First Embodiment

Figure 1:
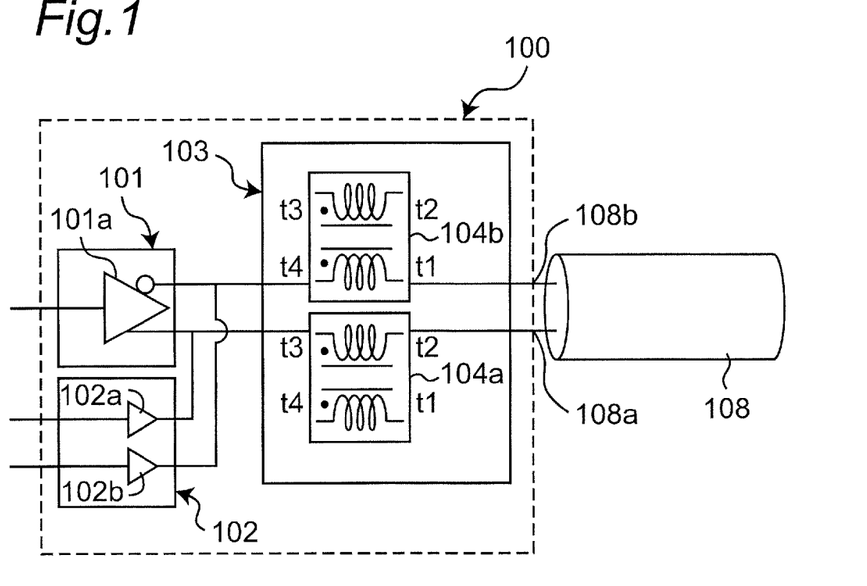
FIG. 1 is a block diagram of a signal transmission device according to a first embodiment.

FIG. 1 is a block diagram of a constitution of a signal transmission device 100 according to a first embodiment.

The signal transmission device 100 has: a differential signal transmission unit 101 including a differential signal output circuit 101a which outputs a differential signal; a single-ended signal transmission unit 102 including single-ended signal output circuits 102a and 102b which outputs independent 2-channel single-ended signals; and a filter unit 103 (noise filter) connected between both the transmission units 101 and 102 and a pair of signal lines 108 including the two signal lines 108a and 108b.

The filter unit 103 includes two common mode filters 104a and 104b. Each of the two common mode filters 104a and 104b includes two inductors. Characteristics of the first common mode filter 104a and the second common mode filter 104b may be substantially the same as each other. Contrary, the first common mode filter 104a and the second common mode filter 104b may have different characteristics. Further, the characteristic of the first common mode filter 104a and the characteristic of the second common mode filter 104b may be suitably selected according to characteristics of a differential signal and a single-ended signal to be used (for example, a frequency band helpful for transmission).

A positive side terminal of the differential signal transmission unit 101 is connected to a terminal t3 of the first common mode filter 104a, and a terminal t2 of the first common mode filter 104a is connected to the first signal line 108a. With such connections, one inductor of the first common mode filter 104a is connected to the positive side output of the differential signal transmission unit 101.

On the other hand, a negative side output terminal of the differential signal transmission unit 101 is connected to a terminal t4 of the second common mode filter 104b, and a terminal t1 of the second common mode filter 104b is connected to a second signal line 108b. With such connections, one inductor of the second common mode filter 104b is connected to the negative side output of the differential signal transmission unit 101.

Therefore, the other inductor of each of the first and second common mode filters 104a and 104b is not connected to the differential signal transmission unit 101 and the pair of signal lines 108.

Further, an output terminal (first channel output terminal) of the single-ended signal output circuit 102a of the single-ended signal transmission unit 102 is connected to the terminal t3 of the first common mode filter 104a. With such a connection, the one inductor of the first common mode filter 104a is connected to the first channel output terminal of the single-ended signal transmission unit 102.

On the other hand, an output terminal (second channel output terminal) of the single-ended signal output circuit 102b of the single-ended signal transmission unit 102 is connected to the terminal t4 of the second common mode filter 104b. With such a connection, the one inductor of the second common mode filter 104b is connected to the second channel output terminal of the single-ended signal transmission unit 102.

Therefore, the other inductors of the first and second common mode filters 104a and 104b are not connected to the single-ended signal transmission unit 102 and the pair of signal lines 108.

In the first common mode filter 104a and the second common mode filter 104b of the signal transmission device 100 according to the first embodiment, one inductor of the two inductors which is not connected to the differential signal transmission unit 101, the single-ended signal transmission unit 102 and the pair of signal lines 108, is opened.

The signal transmission device 100 according to the first embodiment thus constructed can send a differential signal and a single-ended signal. As to the differential signal, a positive side signal and a negative side signal are sent to the pair of signal lines 108. As to the single-ended signal, the first single-ended signal output circuit 102a and the second single-ended signal output circuit 102b can transmit independent two-channel single-ended signals to the pair of signal lines 108.

It is to be noted that the signal transmission device 100 may selectively output any one of the differential signal and the independent 2-channel single-ended signals using the pair of signal lines 108.

The signal transmission device 100 may determine whether the differential signal or the independent 2-channel single-ended signals are output based on a specification of a device to which the pair of signal lines 108 is connected. For example, control may be made so that when a device as a connection destination is a first kind of device, the signal transmission device 100 outputs a differential signal, and when the device as a connection destination is a second kind of device, the signal transmission device 100 outputs independent 2-channel single-ended signals. In this case, the differential signal may be a clock signal, and the independent 2-channel single-ended signals may be data signals.

Figure 2A:
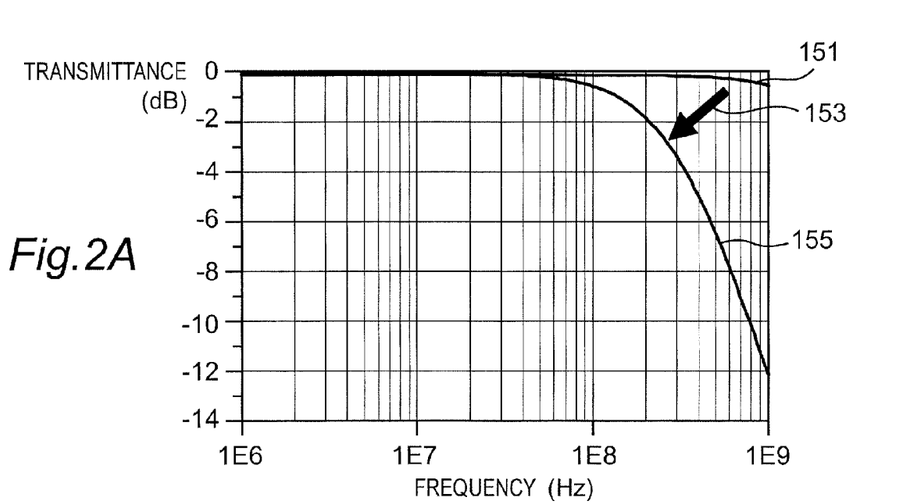
FIG. 2A is a differential signal transmittance spectral characteristic diagram of the signal transmission device according to the first embodiment.
Figure 2B:
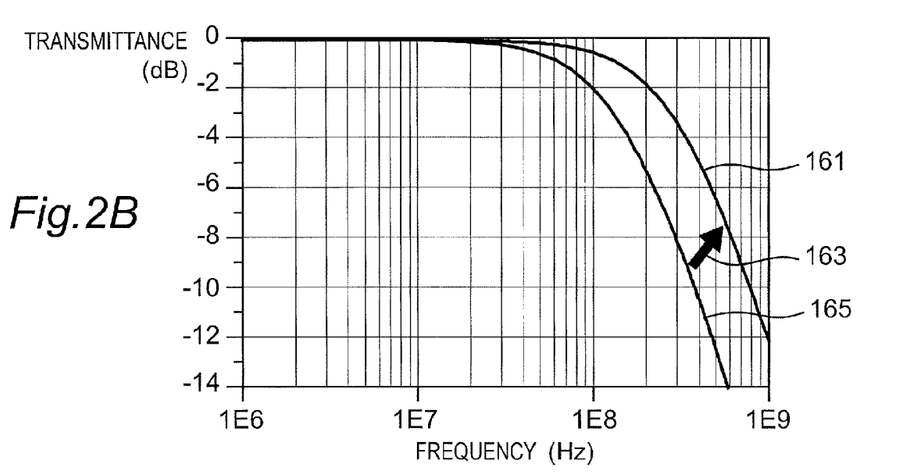
FIG. 2B is a single-ended signal transmittance spectral characteristic diagram of the signal transmission device.

FIGS. 2A and 2B are a diagram illustrating a transmission characteristic of the differential signal in the signal transmission device 100 (FIG. 2A) and a diagram illustrating a transmission characteristic of the single-ended signal (FIG. 2B). The diagrams illustrate transmission characteristic curves 155 and 161 of the differential signal and the single-ended signal when, as described below, the signal lines 108 are connected to the two common mode filters 104a and 104b as shown in FIG. 1; each of filters 104a and 104b shows characteristics represented by a curve 151 and a curve 165 with respect to the differential signal and the single-ended signals.

Figure 3A:
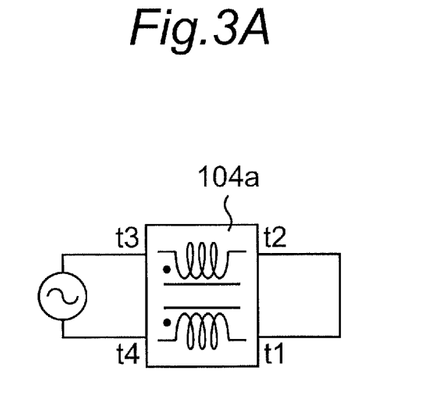
FIGS. 3A, 3B, 3C, and 3D are diagrams illustrating examples of circuits for measuring the transmittance spectral characteristics of the differential and single-ended signals.
Figure 3B:
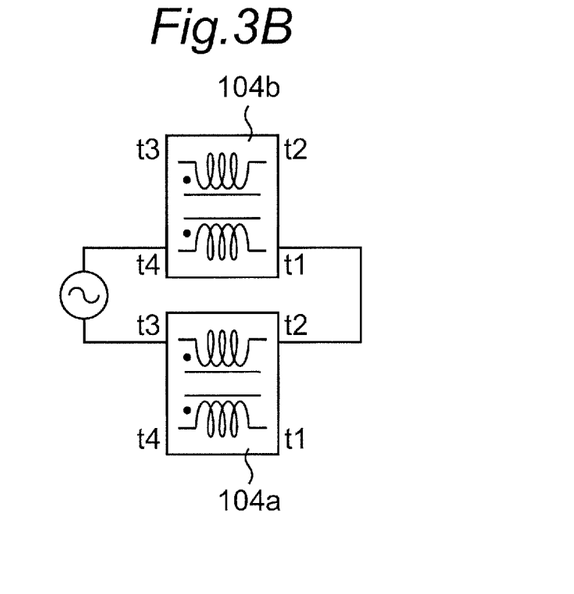

In FIG. 2A, the transmission characteristic curve 151 shows the transmission characteristic of the differential signal in the first common mode filter 104a measured as shown in FIG. 3A, for example. On the contrary, the transmission characteristic curve 155 shows, for example, the transmission characteristic of the differential signal measured by connecting the first common mode filter 104a and the second common mode filter 104b as shown in FIG. 3B. In short, the characteristic curve 155 corresponds to the transmission characteristic of the differential signal in the signal transmission device 100.

Figure 3C:
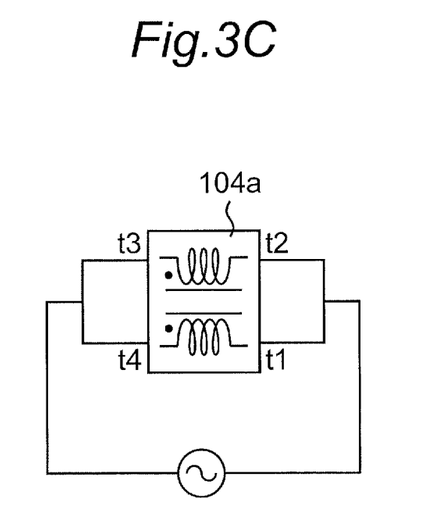
Figure 3D:
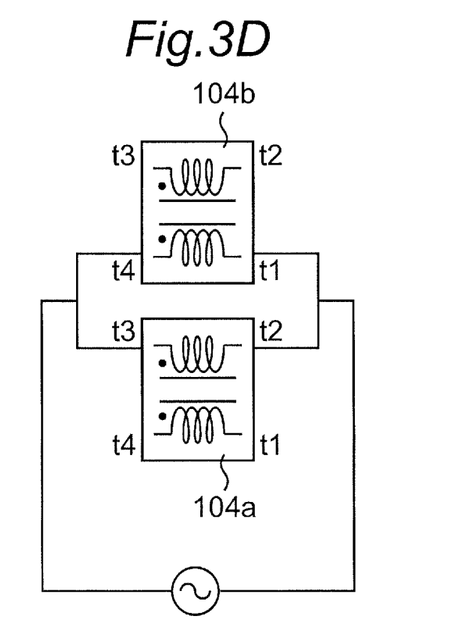

On the other hand, in FIG. 2B, the transmission characteristic curve 165 shows the transmission characteristic of the single-ended signal in the first common mode filter 104a measured, for example, as shown in FIG. 3C. On the other hand, the transmission characteristic curve 161 shows the transmission characteristic of the single-ended signal measured by connecting the first common mode filter 104a and the second common mode filter 104b, for example, as shown in FIG. 3D. In short, the characteristic curve 161 corresponds to the transmission characteristic of the single-ended signal in the signal transmission device 100.

As a result, it is found that when the filter unit 103 is constituted, as shown in FIG. 1, with use of the two common mode filters 104a and 104b, which have the transmission characteristic of the curve 151 with respect to the input differential signal as shown in FIG. 3A and the transmission characteristic of the curve 165 with respect to the input single-ended signals as shown in FIG. 3C, the transmission characteristic of the curve 151 (the curve 165) with respect to the differential signal and the single-ended signal can be obtained.

Needless to say, when the characteristics of the common mode filters to be used are different from the characteristics of the common mode filters 104a and 104b, transmission characteristics different from those in FIGS. 2A and 2B are obtained. However, the following characteristic is maintained. Even when the characteristics of the common mode filters to be used are different from the characteristics of the common mode filters 104a and 104b, the transmission characteristics are common in these figures, namely, transmittance of the differential signal in a high-frequency band reduces (an arrow 153), and transmittance of the single-ended signal increases (an arrow 163).

The signal transmission device 100 having the filter unit 103 showing the above transmittance characteristics is suitable for the following applications.

The signal transmission device 100 is suited for a data interface in a host device such as a memory card. Particularly, this is suitable as a data interface compatible with both SD memory cards complying with the SDXC standards and SD memory cards not complying with the SDXC standards.

In this case, when an SD memory card is connected, the host device may make a determination whether the SD memory card complies with the SDXC standards by handshaking which uses predetermined data communication.

The host device determines that the connected SD memory card is an SD memory card complying with the SDXC standards, the signal transmission device 100 may transmit divided block signals expressed by means of differential signals to the SD memory card via the pair of signal lines 108.

The divided block signals transmitted as the differential signals may be pulse waves having a predetermined frequency. In general, it is beneficial that the pulse waves transmits in the filter unit with the transmittance of −3 (dB) or more for a fundamental frequency and the transmittance of −6 (dB) or more for a third harmonic frequency. Therefore, the filter unit 103 having the transmittance characteristics 155 and 161 suitably transmits, for example, a clock signal with a fundamental frequency of about 150 (MHz) as the differential signal.

Further, when the host device determines that the connected SD memory card does not comply with the SDXC standards, the signal transmission device 100 may transmit data signals expressed by means of independent two-channel single-ended signals to the SD memory card via the first and second signal lines 108a and 108b.

With the filter unit 103 according to the present embodiment, the transmittance of single-ended signals is increased particularly in a higher frequency band as shown by the curve 161 in FIG. 2B (the arrow 163) comparing to that of transmission characteristic 165 shown by the common mode filters used in the generally used connection mode. For this reason, the signal transmission device 100 can widen a band of the single-ended signals in the high frequency side. Further, the signal transmission device 100 can transmit independent two-channel single-ended signals using the pair of signal lines 108 (the first and second signal lines 108a and 108b). Therefore, the signal transmission device 100 takes secure noise countermeasure by means of the filter unit 103 having a very simple constitution and simultaneously can transmit data using the independent two-channel single-ended signals securely at a high speed.

With the filter unit 103 according to the present embodiment, the transmittance of a differential signal is reduced particularly in a higher frequency band as shown by the curve 155 in FIG. 2A (the arrow 153) comparing to that of the transmission characteristic 151 shown by the common mode filters used in the generally-used connection mode. However, the signal transmission device 100 has a transmission characteristic sufficient for transmitting a clock signal with frequency of about 150 (MHz) as the differential signal as described above. Therefore, the signal transmission device 100 takes secure noise countermeasure using the filter unit 103 having a very simple constitution and simultaneously can transmit securely the clock signal having the above frequency as the differential signal.

The signal transmission device 100 according to the present embodiment includes the filter unit 103 having very simple constitution, and takes the secure noise countermeasure and simultaneously can transmit differential signals and independent 2-channel single-ended signals using the pair of signal lines 108.

Modified Example of the First Embodiment

Figure 4:
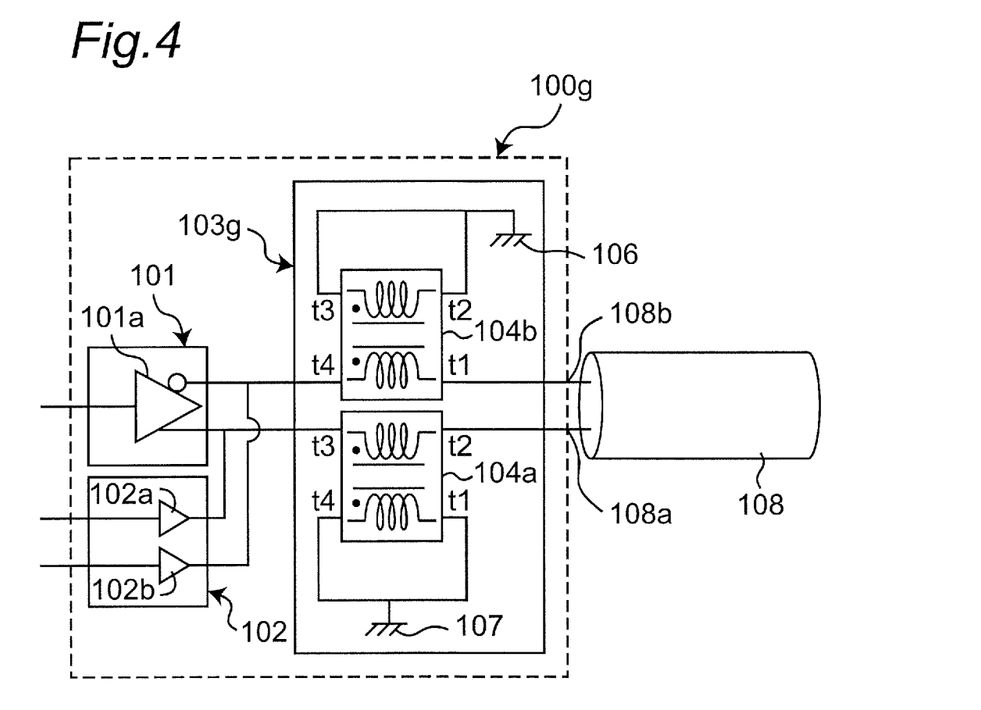
FIG. 4 is a block diagram of signal transmission device according to a modified example of the first embodiment.

FIG. 4 is a block diagram of a constitution of a modified example 100g of the signal transmission device according to the first embodiment.

The signal transmission device 100g is different from the signal transmission device 100 in that both the other inductor of the first common mode filter 104a of the filter unit 103g and the other inductor of the second common mode filter 104b are connected to grounds 107 and 106.

Figure 5A:
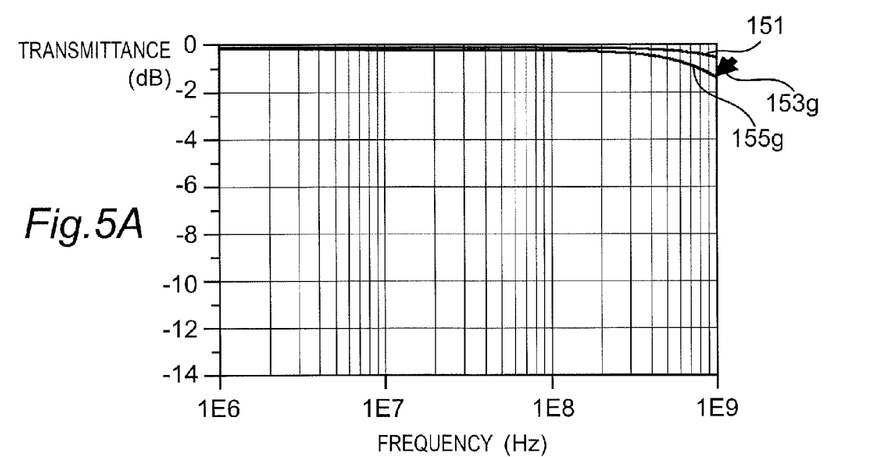
FIG. 5A is a differential signal transmittance spectral characteristic diagram of the signal transmission device according to the modified example of the first embodiment.
Figure 5B:
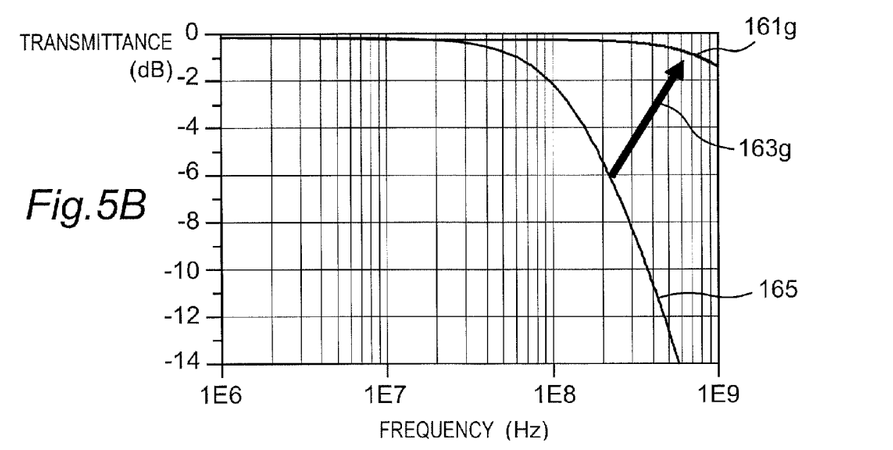
FIG. 5B is a single-ended signal transmittance spectral characteristic diagram of the signal transmission device.

FIGS. 5A and 5B are a diagram illustrating the transmission characteristics of the differential signal in the signal transmission device 100g (FIG. 5A) and a diagram illustrating the transmission characteristic of the single-ended signal (FIG. 5B). The drawings, similarly to FIGS. 2A and 2B, illustrate transmission characteristic curves 155g and 161g of the differential signal and the single-ended signal when the common mode filters 104a and 104b are connected to the signal lines 108 as shown in FIG. 4; each of the two common mode filters 104a and 104b shows the characteristics of the curve 151 and the curve 165 with respect to the differential signal and the single-ended signal.

In FIG. 5A, the transmission characteristic curve 155g shows the transmission characteristic of the differential signal measured by connecting, for example, the first common mode filter 104a and the second common mode filter 104b as shown in FIG. 32 and further connecting the terminals t1 and t4 of the first common mode filter 104a and the terminals t2 and t3 of the second common mode filter 104b to grounds (not shown). That is to say, the characteristic curve 155g corresponds to the transmission characteristic of the differential signal in the signal transmission device 100g.

On the other hand, in FIG. 5B, the transmission characteristic curve 161g shows the transmission characteristic of the single-ended signal measured by connecting the first common mode filter 104a and the second common mode filter 104b, for example, as shown in FIG. 3D, and further connecting the terminals t1 and t4 of the first common mode filter 104a and the terminals t2 and t3 of the second common mode filter 104b to grounds (not shown). That is to say, the characteristic curve 161g corresponds to the transmission characteristic of the single-ended signal in the signal transmission device 100g.

Accordingly, it is found that when the filter unit 103g is constituted, as shown in FIG. 4, with use of the two common mode filters 104a and 104b, the transmission characteristic indicated by the curve 155g and the curve 161g can be obtained for the differential signal and the single-ended signal.

In the modified example 100g, similarly to the case of the signal transmission device 100, the transmission characteristic is such that the transmittance of the differential signal reduces in the high-frequency band (an arrow 153g), and the transmittance of the single-ended signal increases (an arrow 163g) in the high-frequency band.

However, in comparison with the transmission characteristic 155 (161) (FIGS. 2A and 2B) in the signal transmission device 100, the transmission characteristic 155g (161g) (FIGS. 5A and 5B) in this modified example 100g increases in the high-frequency band. This is considered to be because return currents of the differential signal and the single-ended signal that flow in the common mode filters 104a and 104b via the grounds 106 and 107 in a direction opposite to signal currents show a function for improving the transmission characteristic 155 (FIG. 2) of the common mode filters 104a and 104b.

Therefore, in the present modified example 100g, differential signals and independent 2-channel single-ended signals can be transmitted using a band on a higher frequency side than that used in the signal transmission device 100. Therefore, in the modified example 100g, signals can be transmitted at a higher speed with higher quality. Particularly since the modified example 100g, in comparison with the signal transmission device 100, has further increased transmission characteristic in the high-frequency band, the modified example 100g displays a beneficial effect on the signal quality and the noise countermeasure in high-speed transmission of the differential signal.

Second Embodiment

Figure 6:
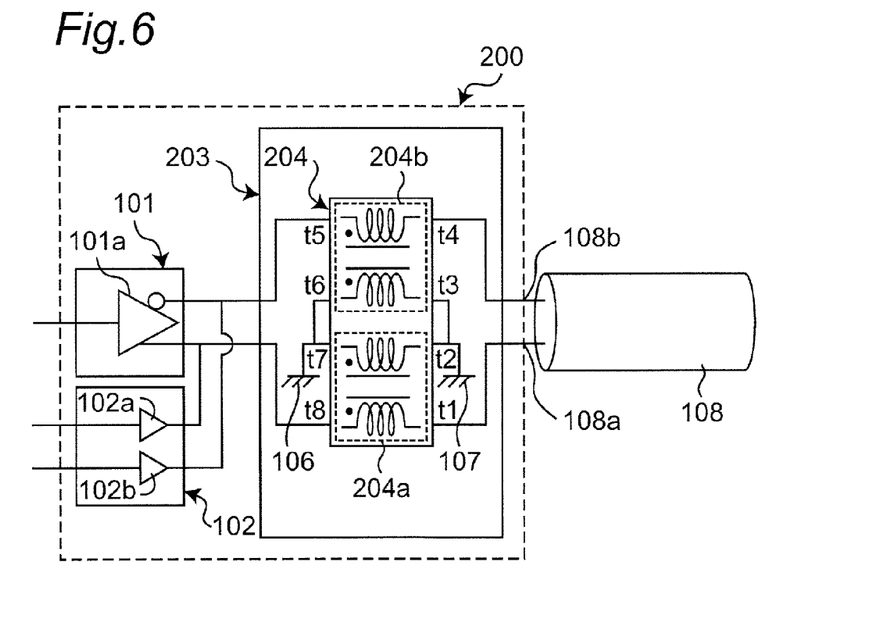
FIG. 6 is a block diagram of a signal transmission device according to a second embodiment.

FIG. 6 is a block diagram of a constitution of a signal transmission device 200 according to a second embodiment. Like constitution of FIG. 6 is denoted by like symbols as FIG. 1 and FIG. 4, and description thereof is suitably omitted.

In the signal transmission device 200, the filter unit 203 has an array type common mode filter 204 including two circuits of common mode filters. The array type common mode filter 204 is more advantageous in mounting area and cost than the two common mode filters.

Further, in a first common mode filter circuit 204a and the second common mode filter circuit 204b of the array type common mode filter 204, the inductors that are not connected to the pair of signal lines 108 are connected to the grounds 106 and 107. However, the inductors not connected to the pair of signal lines 108 may be opened. In another manner, the ground connection may be made to one side of the grounds 106 and 107.

Further, the first signal line 108a and the second signal line 108b are connected to terminals (t1 and t8, and t4 and t5) on the outer sides of the array type common mode filter 204. As a result, the first signal line 108a and the second signal line 108b can be wired so as to be physically further isolated from each other, and thus interference of both the signal lines (108a and 108b) is reduced. That is to say, the first signal line 108a and the second signal line 108b may be connected to the two inductors constituting a combination of inductors physically separated the most also in the array type common mode filter 204.

Third Embodiment

Figure 7:
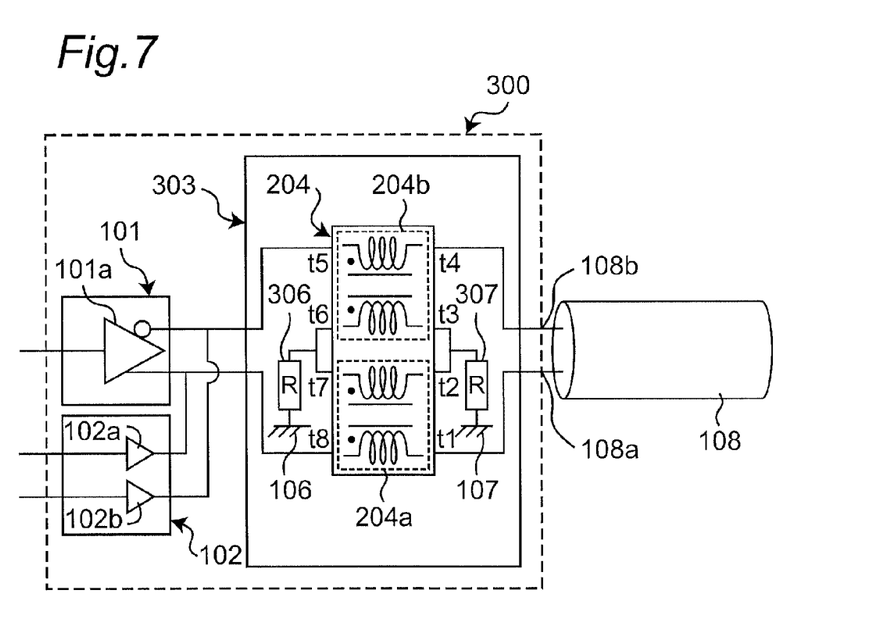
FIG. 7 is a block diagram of a signal transmission device according to a third embodiment.

FIG. 7 is a block diagram of a constitution of a signal transmission device 300 according to a third embodiment. Like constitution of FIG. 7 is denoted by like symbols of FIG. 1, FIG. 4 and FIG. 6, and description thereof is suitably omitted.

In a filter unit 303 of the signal transmission device 300, inductors that are not connected to the pair of signal lines 108 in the first common mode filter circuit 204a and the second common mode filter circuit 204b are connected to the grounds 106 and 107 via resistive elements 306 and 307. The ground connection may be made on one side of the grounds 106 and 107.

In comparison with the above embodiments, the signal transmission device 300 is characterized in that the inductors of the common mode filters that are not used for signal transmission are connected to the grounds via the resistive elements 306 and 307. With this feature, the signal transmission device 300 produces the following working-effect.

Figure 8A:
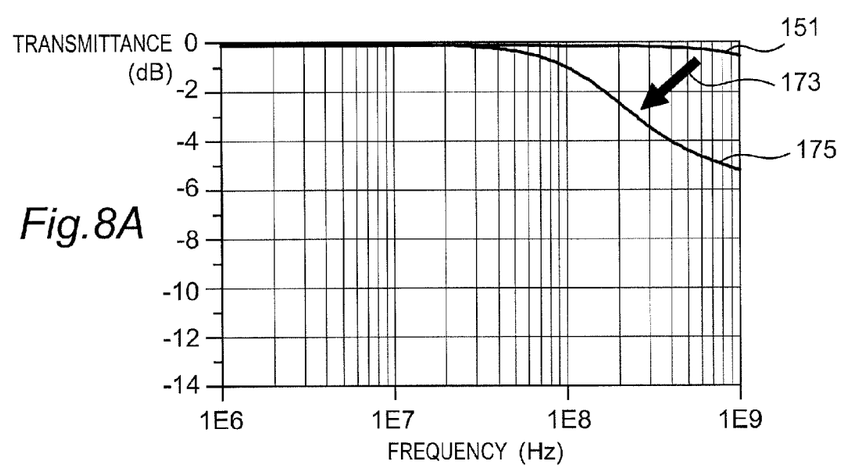
FIG. 8A is a differential signal transmittance spectral characteristic diagram of the signal transmission device according to the third embodiment.
Figure 8B:
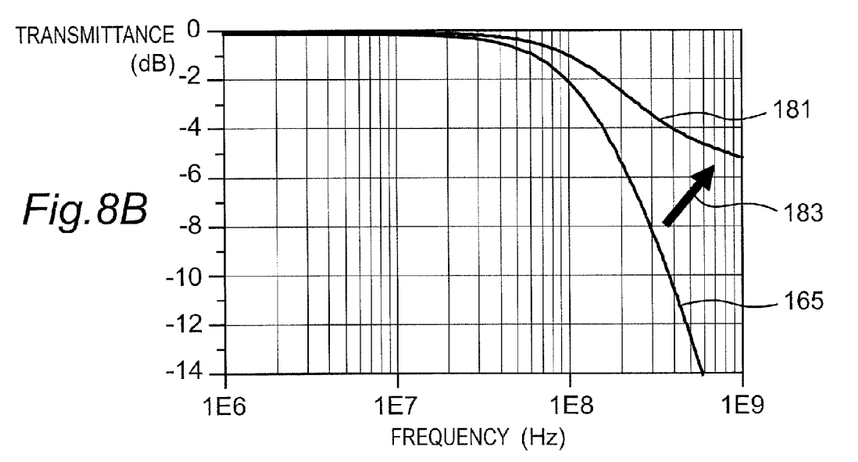
FIG. 8B is a single-ended signal transmittance spectral characteristic diagram of the signal transmission device.

FIGS. 8A and 8B are a diagram illustrating the transmission characteristic of the differential signal in the signal transmission device 300 (FIG. 8A) and a diagram illustrating the transmission characteristic of the single-ended signal (FIG. 8B). The drawings illustrate the transmission characteristic curves 175 and 181 of the differential signal and the single-ended signal when, similarly to FIGS. 2A and 2B and FIGS. 5A and 5B, the two common mode filters 104a and 104b and the signal lines 108 are connected as shown in FIG. 7 in the two common mode filters 104a and 104b; each of the two common mode filters shows the characteristics of the curve 151 and the curve 165 with respect to the differential signal and the single-ended signal.

In FIG. 8A, the transmission characteristic curve 175 shows the transmission characteristic of the differential signal measured by connecting the first common mode filter 104a and the second common mode filter 104b, for example, as shown in FIG. 3B and further connecting the terminals t1 and t4 of the first common mode filter 104a and the terminals t2 and t3 of the second common mode filter 104b to the grounds (not shown) via the resistive elements. That is to say, the characteristic curve 175 corresponds to the transmission characteristic of the differential signal in the signal transmission device 300.

On the other hand, in FIG. 8B, the transmission characteristic curve 181 shows the transmission characteristic of the single-ended signal measured by connecting the first common mode filter 104a and the second common mode filter 104b, for example, as shown in FIG. 3D, and further connecting the terminals t1 and t4 of the first common mode filter 104a and the terminals t2 and t3 of the second common mode filter 104b to the grounds (not shown) via the resistive elements. That is to say, the characteristic curve 181 corresponds to the transmission characteristic of the single-ended signal in the signal transmission device 300.

As described above, in the filter unit 303 of the signal transmission device 300, the inductors that are not connected to the signal lines 108 are connected to the grounds via the resistive elements 306 and 307. With this constitutional feature, the transmission characteristics 175 (181) of the differential signal and the single-ended signal show the transmission characteristic that is intermediate between the transmission characteristic (155, 161) of the signal transmission device 100 shown in FIGS. 2A and 2B and the transmission characteristic (155g, 161g) of the signal transmission device 100g shown in FIGS. 5A and 5B in the high-frequency band.

In short, with the filter unit 303 according to the present embodiment, the other inductors of the first and second common mode filter circuits 204a and 204b are connected to the grounds via the resistive elements 306 and 307, so that the high-frequency band transmission characteristic, which is intermediate between the high-frequency band transmission characteristic in the case where the inductors are opened and the high-frequency band transmission characteristic in the case where the inductors are short-circuited to the grounds, can be obtained. For this reason, in the signal transmission device 300, the noise countermeasure and a signal high-speed high-quality transmitting ability easily keep suitable balance in a frequency band for the signals being used.

In other words, the filter unit 103 of the signal transmission device 100 corresponds with a case where the resistance value of the resistive elements 306 and 307 in the filter unit 303 of the signal transmission device 300 are infinite, and the filter unit 103g of the signal transmission device 100g corresponds with a case where the resistance values of the resistive elements 306 and 307 in the signal transmission device 300 are zero.

Based on the above relationship, in the signal transmission device 300, the resistance values of the resistive elements 306 and 307 are suitably selected, so that the filter unit 303, which shows the high-frequency band transmission characteristic being intermediate between the transmission characteristic 155 (161) (FIGS. 2A and 2B) and the transmission characteristic 155g (161g) (FIGS. 5A and 5B), is designed very easily. Therefore, in the signal transmission device 300, the design is very easy for the transmission characteristic for the signals being used.

Therefore, in the signal transmission device 300, the characteristics of the resistive elements 306 and 307 are designed suitably, so that the noise countermeasure and the signal quality can be improved more precisely and easily than the signal transmission device according to the above embodiments.

Fourth Embodiment

Figure 9:
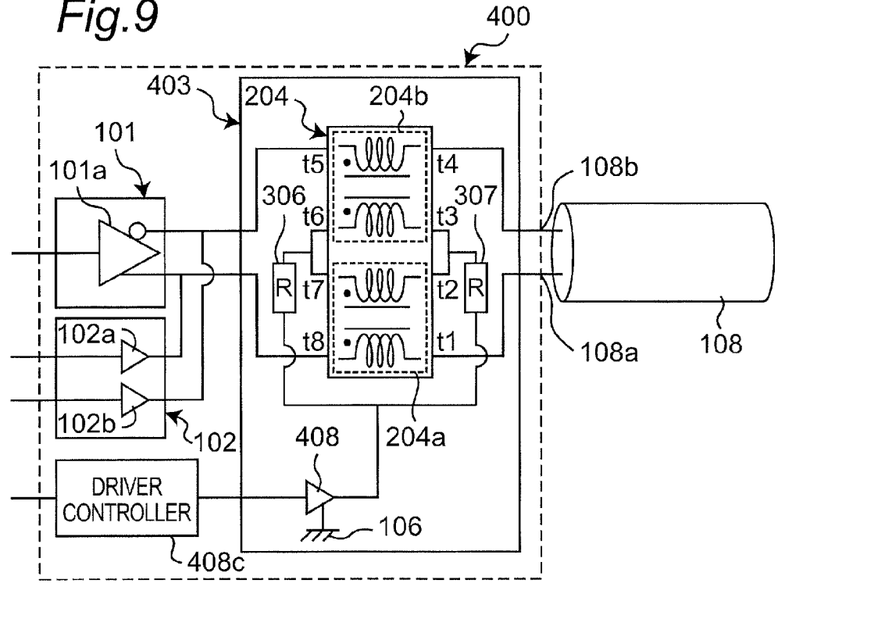
FIG. 9 is a block diagram of a signal transmission device according to a fourth embodiment.

FIG. 9 is a block diagram of a constitution of a signal transmission device 400 according to a fourth embodiment. Like constitution of FIG. 9 is denoted by like symbols of FIG. 1, FIG. 4, FIG. 6 and FIG. 7, and description thereof is suitably omitted.

In a filter unit 403 of the signal transmission device 400, inductors, which are not connected to the pair of signal lines 108 of the first common mode filter circuit 204a and the second common mode filter circuit 204b, can be opened or connected to the grounds by a function of a driver 408. Here, the driver 408 is controlled into an open state (an inactive state showing high impedance) and a ground connected state (a low output state) by a driver controller 408c.

Therefore, in the signal transmission device 400, the driver 408 is controlled so that the transmittance characteristics of the differential signal and the single-ended signal can be switched between the characteristic 155 (characteristic 161) in FIGS. 2A and 2B and the characteristic 175 (characteristic 181) in FIGS. 8A and 8B.

Therefore, in the signal transmission device 400, when only the differential signal transmission unit 101 out of the differential signal transmission unit 101 and the single-ended signal transmission unit 102 is used so as to transmit the differential signal, the driver 408 is controlled into the low output state, and the differential signal can be transmitted with the transmission characteristic in the high-frequency band being maintained comparatively high (the characteristic 175 in FIG. 8A). On the contrary, when the independent single-ended signals are transmitted by using only the single-ended signal transmission unit 102, the driver 408 is controlled into the high impedance state (inactive state), and the independent 2-channel single-ended signals can be transmitted with the transmission characteristic in the high-frequency band being relatively low and a high-frequency noise suppressing effect being improved (the characteristic 161 in FIG. 2B).

Therefore, in the signal transmission device 400, when the differential signal or the independent 2-channel single-ended signals are selectively transmitted, a level of the high-frequency noise suppressing effect is suitably switched so that more secure signal transmission and more effective noise countermeasure can be compatible with each other.

In addition, suitable control of an output impedance of the driver 408 makes the resistive elements 306 and 307 unnecessary.

Fifth Embodiment

Figure 10:
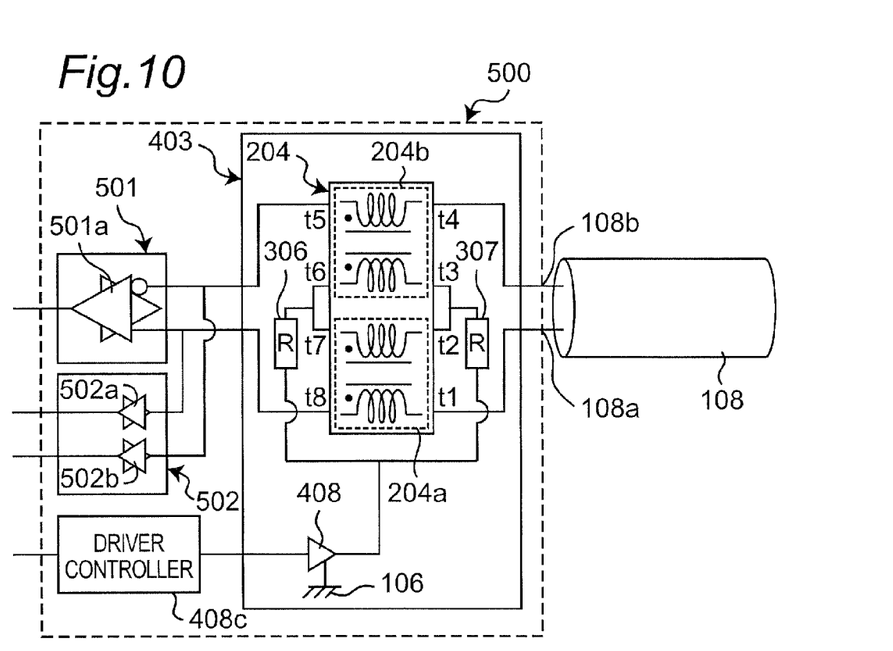
FIG. 10 is a block diagram of a signal transmission device according to a fifth embodiment.

FIG. 10 is a block diagram of a constitution of a signal transmission device 500 according to a fifth embodiment. Like component of FIG. 10 is denoted by like symbols of FIG. 1, FIG. 4, FIG. 6, FIG. 7 and FIG. 9, and description thereof is suitably omitted.

Different from the signal transmission device according to the above embodiments, the signal transmission device 500 has a differential signal transmitting/receiving unit 501 having a differential signal input/output circuit 501a capable of transmitting/receiving a differential signal and a single-ended signal transmitting/receiving unit 502 including single-ended signal input/output circuits 502a and 502b capable of inputting/outputting the independent 2-channel single-ended signals.

Therefore, the signal transmission device 500 can receive a differential signal and independent 2-channel single-ended signals as well as transmit a differential signal and independent 2-channel single-ended signals.

Therefore, the signal transmission device 500 can be used as a signal transmitting/receiving device.

CONCLUSION

The signal transmission device according to the above embodiments realizes the noise countermeasure (SI (Signal Integrity) & EMC (ElectroMagnetic Compatibility) countermeasure) for the transmission of the differential signal and the single-ended signal with the simple constitution, and thus this device is advantageous in the points both of a packaging area and a cost.

Further, in some of the embodiments, the signal transmission device can control to switch the high-frequency band transmission characteristic of the noise filter (the filter unit). For this reason, when the differential signal or the single-ended signals are selectively transmitted, the signal transmission device can select the signal transmission characteristics suitable for the respective signals so as to be capable of transmitting the signals. Therefore, in the signal transmission device according to some of the embodiments, signal quality can be further improved and more secure noise countermeasure can be taken.

Further, the signal transmission device can receive a differential signal and independent 2-channel single-ended signals as well as transmit a differential signal and independent 2-channel single-ended signals. Therefore, the signal transmission device according to the embodiment can be used as the signal transmitting/receiving device.

INDUSTRIAL APPLICABILITY

In the signal transmission device according to the above embodiments, the constitution relating to the noise countermeasure is made simplified, and the device can be useful particularly as a signal transmission device that can transmit the differential signal and the independent 2-channel single-ended signals.

REFERENCE SIGNS LIST

100: Signal transmission device (first embodiment)
100g: Signal transmission device (modified example of first embodiment)
101: Differential signal transmission unit
101a: Differential signal output circuit
102: Single-ended signal transmission unit
102a: First single-ended signal output circuit
102b: Second single-ended signal output circuit
103: Filter unit (first embodiment)
103g: Filter unit (modified example of first embodiment)
104a: First common mode filter
104b: Second common mode filter
106: Ground
107: Ground
108: A pair of signal lines
108a: First signal line
108b: Second signal line
200: Signal transmission device (second embodiment)
203: Filter unit (second embodiment)
204: Array type common mode filter
204a: First common mode filter circuit
204b: Second common mode filter circuit
300: Signal transmission device (third embodiment)
306: Resistive element
307: Resistive element
400: Signal transmission device (fourth embodiment)
403: Filter unit (fourth embodiment)
408: Driver
408c: Driver controller
500: Signal transmission device (fifth embodiment)
501: Differential signal transmitting/receiving unit
501a: Differential signal input/output circuit
502: Single-ended signal transmitting/receiving unit
502a: First single-ended signal input/output circuit
502b: Second single-ended signal input/output circuit

The invention claimed is:

1. A signal transmission device, comprising:
a differential signal transmission unit operable to output a differential signal to a pair of signal lines including a first signal line and a second signal line, the differential signal transmission unit having two output terminals;
a single-ended signal transmission unit operable to output mutually independent two-channel single-ended signals to the first signal line and the second signal line respectively, the single-ended signal transmission unit having two output terminals; and
a filter unit including a first common mode filter and a second common mode filter, wherein:
one of the output terminals of the differential signal transmission unit and one of the output terminals of the single-ended signal transmission unit are connected to the first signal line via one of two inductors of the first common mode filter of the filter unit; and
the other one of the output terminals of the differential signal transmission unit and the other one of the output terminals of the single-ended signal transmission unit are connected to the second signal line via one of two inductors of the second common mode filter of the filter unit.

2. The signal transmission device according to claim 1, wherein the other inductor of the first common mode filter and the other inductor of the second common mode filter are opened.

3. The signal transmission device according to claim 1, wherein the other inductor of the first common mode filter and the other inductor of the second common mode filter are grounded.

4. The signal transmission device according to claim 1, wherein the other inductor of the first common mode filter and the other inductor of the second common mode filter are grounded via resistive elements.

5. The signal transmission device according to claim 3, further comprising:
  a driver circuit connected between the other inductor of the first common mode filter and the ground and between the other inductor of the second common mode filter and the ground; and
  a driver controller operable to control a state of the driver circuit between a high impedance state and a low output state.

6. The signal transmission device according to claim 5, wherein when the signal transmission device outputs a differential signal, the driver controller controls the state of the driver circuit to the low output state, and when the signal transmission device outputs the single-ended signal, the driver controller controls the state of the driver circuit into the high-impedance state.

7. The signal transmission device according to claim 1, wherein the first common mode filter and the second common mode filter are two common mode filter circuits included in one array type common mode filter.

8. The signal transmission device according to claim 7, wherein the one inductor of the first common mode filter and the one inductor of the second common mode filter constitute a combination of two inductors most isolated physically in the array type common mode filter.

9. The signal transmission device according to claim 1, further comprising a differential signal receiving unit operable to receive a differential signal from the pair of signal lines via the filter unit.

10. The signal transmission device according to claim 1, further comprising a single-ended signal receiving unit operable to receive mutually independent 2-channel single-ended signals from the first signal line and the second signal line via the filter unit respectively.

11. The signal transmission device according to claim 1, wherein a clock signal is transmitted as the differential signal.

* * * * *